(12) United States Patent
Forman et al.

(10) Patent No.: US 8,590,496 B2
(45) Date of Patent: Nov. 26, 2013

(54) SYSTEM INCLUDING AN ELECTROMAGNETICALLY ENERGIZED PISTON MOTOR DESIGNED TO CONVERT CHEMICAL AND ELECTRICAL ENERGY TO MECHANICAL ENERGY

(76) Inventors: Mark Forman, Ringwood, IL (US); Javier C. Sanchez, Marathon, WI (US)

(*) Notice: Subject to any disclaimer, the term of this patent is extended or adjusted under 35 U.S.C. 154(b) by 133 days.

(21) Appl. No.: 13/208,411

(22) Filed: Aug. 12, 2011

(65) Prior Publication Data

US 2012/0248785 A1     Oct. 4, 2012

Related U.S. Application Data

(63) Continuation of application No. 12/589,116, filed on Oct. 16, 2009, now Pat. No. 7,997,240.

(60) Provisional application No. 61/200,064, filed on Nov. 24, 2008.

(51) Int. Cl.
    *F02B 71/00*     (2006.01)
(52) U.S. Cl.
    USPC ............ 123/46 R; 123/46 E; 123/538; 123/2; 123/3
(58) Field of Classification Search
    USPC ............... 123/538, 558, 37, 3, 2, 46 R, 46 E; 310/156.43, 216, 113, 179, 40 R, 558, 310/15; 180/65.54
    See application file for complete search history.

(56) References Cited

U.S. PATENT DOCUMENTS

| 4,631,455 A | * | 12/1986 | Taishoff | 318/37 |
| 6,516,905 B1 | * | 2/2003 | Baumert et al. | 180/53.8 |
| 6,915,869 B2 | * | 7/2005 | Botti et al. | 180/65.245 |
| 7,178,616 B2 | * | 2/2007 | Botti et al. | 180/65.1 |
| 7,793,634 B2 | * | 9/2010 | Elmaleh | 123/197.1 |
| 2010/0251692 A1 | * | 10/2010 | Kinde, Sr. | 60/226.1 |

OTHER PUBLICATIONS

International Search Report PCT/US2011/047450, Apr. 10, 2012.

* cited by examiner

*Primary Examiner* — Noah Kamen
*Assistant Examiner* — Long T Tran
(74) *Attorney, Agent, or Firm* — Niro, Haller & Niro

(57) ABSTRACT

An energy conversion and free hydrogen producing system including a electromagnetically energized reciprocating piston motor, a plurality of lead acid flow through batteries, each consisting of a plurality of individual flow through lead acid cells, and a hydrogen burning internal combustion engine. With concentrated sulfuric acid as the primary fluid, the electromagnetically energized reciprocation piston motor, and the hydrogen burning internal combustion engine provide a rotational torque output.

14 Claims, 7 Drawing Sheets

SYSTEM INCLUDING AN ELECTROMAGNETICALLY ENERGIZED PISTON MOTOR DESIGNED TO CONVERT CHEMICAL AND ELECTRICAL ENERGY TO MECHANICAL ENERGY

FIELD OF THE INVENTION

The present invention relates to a system and method for the efficient conversation of chemical and electrical energy to mechanical energy. More particularly, electrical and chemical energy are interchanged and used to efficiently produce rotating mechanical energy such as rotational torque that could be used for propelling a motor vehicle, or powering a pumping station or other energy dependent installations.

BACKGROUND OF THE INVENTION

The present concern with preserving natural resources, and reducing environmental pollution, especially air pollution, has driven a demand for more efficient and less polluting systems and methods for providing mechanical energy, particularly rotating mechanical energy to propel motor vehicles. Such less polluting systems and methods will reduce the use of carbon based fuels, thereby preserving natural resources and reducing air pollution.

The storage and use of electrical energy has often been proposed and used as a less polluting system for propulsion of motor vehicles. However, practical battery size and weight has limited the travel of a vehicle between recharges of the battery. So called hybrid vehicles have been developed to address the travel limitation of battery powered vehicles. Internal combustion engines burning hydrogen have been proposed as a more efficient and less polluting system and method. As set forth in the publication by the Argonne National Laboratory: TranForm Vol. 6, No. 1, *Argonne Engineers see into the future of hydrogen internal combustion engines*, Sep. 9, 2006. However, the risks presented by the storage of compressed hydrogen in a vehicle has been a serious drawback to implementing its use. That risk is increased as a greater quantity of hydrogen is carried on the vehicle so as to permit more extensive travel without the need for refueling. The process of refueling is also fraught with more danger than the current refueling with gasoline or diesel fuel.

Accordingly, it would be desirable to provide an energy conversion system and method for providing vehicle propulsion which combines the advantages of an electromagnetically energized reciprocating motor that can be instantly refueled as opposed to a system that would require a charging period such as in an electric or hybrid vehicle thereby requiring extended down time or battery exchange.

Accordingly, it would also be desirable to provide an energy conversion system and method for providing vehicle propulsion, which combines the advantages of electromagnetically energized reciprocating motor a hydrogen powered internal combustion engine, batteries for the storage and delivery of energy, sulfuric acid as a fuel supplied to the batteries, and hydrogen as a fuel for the internal combustion engine, while providing for greatly reduced air pollution. Further, it would be desirable that the consumable materials, which must be carried on board the vehicle to produce the kinetic energy to drive the vehicle be readily stored in a safe manner and in sufficient quantity to provide a desired range of operation of the vehicle. As set forth in the previously mentioned article, *Argonne Engineers see into the future of hydrogen internal combustion engines*, a hydrogen fuel engine will be close to 45% efficient as compared to the 25% efficiency of standard automobile engines.

It would also be desirable to provide lubrication, cooling and a fuel source to an electromagnetically energized reciprocating motor that has demonstrated weight advantages over a conventional electric motor. The horsepower to weight ratio of conventional electric motors requires that the weight of the motor increases as the horsepower increases to a greater extent than with a electromagnetically energized reciprocating motor. It would also be desirable to extend the available useful output of a battery by providing a method of recharging the battery during use. The efficiency of a conventional electric motor decreases as a load is placed on it compared to an electromagnetically energized reciprocating motor that creates more electrolysis of the electrolyte cooling the motor as a load is placed on it.

SUMMARY OF THE INVENTION

In accordance with this invention a system and method for converting electrical and chemical energy to kinetic energy is provided which is energy efficient and contributes very little pollution to the atmosphere. Further, the materials consumed to produce the kinetic energy are readily stored on board a vehicle in sufficient quantity to provide a desired range of operation of the vehicle, and without significant danger to the vehicle occupants should the vehicle be damaged in an accident.

The system and method of this invention includes a relatively maintenance free long life electromagnetically energized reciprocating piston motor that is energy efficient, enhances lead acid flow battery performance and produces hydrogen and oxygen gases which are recovered to provide as a fuel to a hydrogen burning internal combustion engine. The system exhibits extended shelf life and is not as adversely affected by extreme temperature changes, as are certain hydrogen burning vehicles. Nor, is it adversely affected by changes in barometric pressures.

The system has very low maintenance requirements wherein it utilizes readily interchangeable components which include the electromagnetic reciprocating piston motor, a plurality of lead acid flow batteries, a cooling system, a small hydrogen burning internal combustion engine, an alternator and rectifier combination or a DC generator, storage tanks for battery electrolyte, concentrated sulfuric acid, water, and a control system.

The electromagnetically energized reciprocating piston motor, which is a first principal component of the system of this invention, includes a plurality of reciprocating pistons, formed of magnetic material such as pig iron, connected by connecting rods to a crankshaft. The crankshaft is located in a block assembly. Electromagnetic fields, developed by electrical current passing through a pair of spaced coils surrounding each piston, are utilized to cause reciprocation of the piston which is formed of a magnetic material. The coils are energized by electrical current provided by a plurality of lead acid flow batteries. The batteries are provided a constant charge by electrical current from an alternator or de generator. The pistons reciprocate in non-magnetic sleeves or cylinders. In a preferred embodiment, the energization of the coils is controlled by proximity switches actuated by rotation of the crankshaft of the engine. However, any number of firing mechanisms may be used, such as microwave actuated switching mechanisms. The proximity switches are located adjacent to various portions of the crankshaft such that the coils at opposite ends of the piston housings are energized and de-energized in the proper sequence to cause the pistons to reciprocate and thereby cause rotation of the crankshaft. While the rotation of the crankshaft by the pistons is on a similar basis to that in an internal combustion engine, it differs in that the movement of the pistons in each direction is a power stroke rather than every other as in a two cycle engine or every fourth cycle in a four cycle engine. While in a preferred embodiment six pistons are connected to the crankshaft, any number of pistons could be used in accordance with this invention.

In accordance with this invention, a V-shaped block of plastic or other similar material is provided to house the cylinders, crankshaft, and electrolysis cells. The housing may provided for various even numbers of cylinders and electrolysis cells depending on the output required from the system. The V-shaped block could also be made of aluminum or a similar light weight material to provide greater structural support for higher torque outputs from the system.

An internal reservoir is formed within the inner recess of the V-shaped block to contain the electrolyte and to provide for the flow of the electrolyte to the electrolysis cells to the electrolyte jackets surrounding the main piston assemblies. In this preferred embodiment an aluminum carrier is provided to mount the is crankshaft assembly and provide for the attachment of the system to a structure, such as a vehicle. A small internal combustion engine is mounted within the uppermost area of the V-shaped block, providing for the crankshaft of the internal combustion engine to be in line with, and directly above the crankshaft of the reciprocating piston engine. A main manifold may be formed in the V-shaped block to deliver hydrogen gas $H^2$ from the upper ends of the closed chambers surrounding the pistons to the internal combustion engine. The V-shaped block may also provide an external space between the outside leading edge of the internal combustion engine and the adjacent area of the V-shaped block. The space in the V-shaped block between the electrolyte jackets and the outer wall facing the center of the V-shaped block provides for a relief point and containment in the event of a rupture of a electrolyte jacket.

Each piston, which is preferably made of ASTM 60 cold rolled steel, reciprocates in a non-magnetic sleeve or inner tube. Coils of wire are wrapped around the inner tube, which may be formed of plastic or other non-magnetic material. The coils are positioned along the inner tube, without a major separation space, such that when one end and a major portion of a piston is essentially located within one end of the coils, a small portion of the other end of the piston is located within the other coil. The coils are encapsulated, such as by an electrical insulating material, to prevent deterioration from contact with the electrolyte, and to prevent electrical shorts within the coil or between the coils and other conductive components. An outer tube is also formed of a non-magnetic material and insulating material surrounds the coils and inner tube.

A main manifold may be provided for supplying hydrogen gas $H^2$, oxygen and residual materials such as lead and sulfur carried with the gases to the internal combustion engine. The main manifold is provided adjacent the outer upper surface of the V-shaped block, located over the top of the jacket assembly and the electrolysis cell assembly, and is connected to the intake manifold of the internal combustion engine. In this embodiment of the invention, the hydrogen gas $H^2$, oxygen and residual materials are delivered directly to the intake manifold of the internal combustion engine. However, delivery could also be to the carburetor, air intake, or directly to the intake valve.

Flow paths for the battery electrolyte includes the reciprocating piston motor which includes a reservoir, a mixing chamber, the lead acid flow batteries and the cooling radiator. The sleeves in which the pistons reciprocate are surrounded by an electrolyte jacket. The battery electrolyte flowing through the jacket is subjected to the changing electromagnetic fields produced by electrical current flow in the coils and to direct current passing through the electrolyte from the coils to lead plates surrounding and spaced from the coils in the jacket. The changing electromagnetic fields promote electrolysis of the electrolyte and the release of hydrogen gas therefrom. Efficiency is realized through the use of magnetic pick up coils centered between the spaced coils which cancel the residual magnetic field which occurs when a coil is de-energized, and converts the electro-mechanical energy of the collapsing magnetic field into direct current through the use of a rectifier system, which applied between spaced metal plates located in the jacket to produce additional electrolysis of the electrolyte in the jacket. The changing electromagnetic fields promote electrolysis of the electrolyte and the release of hydrogen through the use of the magnetic pick up coils.

Additional electrolysis of the electrolyte is realized with the placement of electrolysis cells located in the block assembly which are provided with direct current recovered at the crank shaft of the reciprocating motor. Energization of the spaced coils create electromagnetic fields radiating outward from the coils. With the reciprocal movement of the of the piston assemblies, which are preferably formed of pig iron, the changing magnetic fields or flux induces a voltage in the piston assemblies which is picked up at the crankshaft of the motor. With the spaced coil being energized by a 36 volt supply, the induced negative voltage with respect to ground picked up at the crankshaft is approximately 144 volts. This voltage is applied to a rectifier to supply a direct current to electrolysis cells located in the reservoir in the block assembly. Hydrogen gas $H^2$ released from the electrolyte in the reservoir in the block assembly is provided as fuel to the hydrogen burning internal combustion engine.

Components of the electromagnetically energized reciprocating motor will now be described in further detail. The pistons and the structures surrounding the pistons are the elements most unique to the electromagnetically energized reciprocating motor of this invention. Each piston, which is made of pig iron, reciprocates in a non-magnetic sleeve or inner tube forming a piston chamber. Spaced apart coils of wire are wrapped around the inner tube, which may be made of plastic or other non-magnetic material. The coils are spaced apart from each other, with one near each end of the inner tube, such that when one of the elongate pistons is essentially located within one of the coils, a small portion of the other end of the piston is located within the coil at the other end of the inner tube. The coils are insulated, such as by being encapsulated in an electrical insulating material. An outer wall or tube, also formed of a non-magnetic and insulating material surrounds the coils and inner tube to form the electrolyte jacket surrounding the piston chamber. Space is provided between the outer tube and the coils, to permit electrolyte to flow between the inner tube and the outer tube and around the coils in the electrolyte jacket. Closures are provided between the inner and outer tubes at both ends of the tubes. Connections are provided in the outer tube, near each end of the tube to provide for the flow of electrolyte into and out of the electrolyte jacket or space between the inner and outer tubes.

In a preferred embodiment of this invention four magnetic pick up coils are located in the electrolyte jacket, centered between the spaced apart coils and having stainless steel plates connected through a rectifier array to increase the release of hydrogen gas $H^2$. The energy recovered by the magnetic pick up coils further increases the production of hydrogen gas $H^2$ through the electrolysis process.

Two spaced apart lead plates are also installed in the electrolyte jacket adjacent the inner wall of the outer tube. Current is applied to one terminal of each of the coils through a conductor from the negative terminal of the battery. The other terminal of each coil is connected to a first lead plate located adjacent the inner surface of the outer wall of the electrolyte jacket. The first lead plate extends over less than one half of the circumference of the jacket. A second lead plate covers less than the other one half of the circumference of the jacket such that the edges of the plates are spaced apart by at least and one and one half inches. The second lead plate is connected by a conductor to the positive terminal of the battery. Thus, the current passing through the coils must pass through the electrolyte from the first lead plate to the second lead plate to complete the circuit through the coils to the battery terminals. The current passing through the electrolyte promotes electrolysis of the electrolyte and the generation of hydrogen gas $H^2$. As a potential is applied between the lead plates, the electrolyte at first presents a significant resistance to current flow. However, after the current flow is established, the electrolyte presents a very low resistance to current flow between the lead plates. By increasing the distance between the edges of the plates, more electrolyte is subjected to current flow, and therefore the electrolysis of the electrolyte is increased. The lead plates can be modified, both in thickness, and by increasing or decreasing the surface area to expose more or less of electrolyte in the electrolyte jacket to the potential difference between the plates to manage long term durability of the plates.

Concentrated sulfuric acid is the primary consumable fuel of the energy conversion system and method of this invention. The concentrated sulfuric acid is stored in a tank which is designed to withstand accidental damage, such as in a vehicle accident, without spilling of the acid. The acid holding tank provides for the introduction of the acid, such as sulfuric acid into the lead acid flow batteries using metering valves regulated by an ohm (resistance) reading of the electrolyte in each battery, so as to maintain the electrolyte specific gravity.

A small hydrogen burning internal combustion engine is provided to consume the by-product gasses created during the electrolysis process and adds to the overall torque output of the system. Exhaust gas from the hydrogen burning internal combustion engine is recirculated into the intake manifold to increase the temperature of the gas mixture. The combustion engine is provided to drive a DC generator which supplies a direct current trickle charge to the batteries, which in turn supply the direct current used to energize the coils and create the electromagnetic fields which cause reciprocation of the pistons of the electromagnetically energized reciprocating motor. In a preferred embodiment, the direct current is supplied to the coils through proximity switches actuated by lobes on the crankshaft of the electromagnetically actuated reciprocating piston engine. A direct current starter motor is provided to start the rotation of the crankshaft of the electromagnetically energized reciprocating motor.

Since both the electrolyte circulating in the system of this invention and the rectifier arrangement require cooling, a cooling system, such as a radiator is provided in the flow path of the electrolyte. A fan driven by the reciprocating piston motor is provided to cause the flow of cooling air through the radiator and over the rectifier arrangement. A pump is provided to cause the circulation of the electrolyte through the electrolyte jackets of the cylinders, lead acid flow batteries and the radiator.

The system of this method also includes control circuits, and control input devices provided on a control panel, by which the operation of the system is controlled. The control panel is provided with input devices to start and control the operation of the system. A first input device is used to energize the starter motor to cause rotation of the crankshaft of the reciprocating piston motor. With the crankshaft of the reciprocating piston motor rotating, another input device can be actuated to cause direct current to be supplied to the coils of the reciprocating piston motor through the proximity switches. A further input device is provided to control the rotational speed of the reciprocating piston motor.

Still another input device is used to control the supply hydrogen gas $H^2$.s water vapor and byproducts carried with the water vapor to the internal combustion engine, once the reciprocating engine has reached operating temperature and the release of hydrogen gas $H^2$ from the system is sufficient to supply the internal combustion motor. Another device is then used to energize a clutch locking the internal combustion engine drive shaft to the reciprocating motor crankshaft.

The hydrogen burning internal combustion engine is started once the reciprocating piston motor reaches operation temperature and a supply of hydrogen gas $H^2$, Oxygen, and water vapor is available. A DC generator is driven by the internal combustion engine. The dc generator output is supplied as a trickle charge to the batteries which supplies direct current to the pair of coils located at opposite ends of each of the piston chambers. The internal combustion engine also drives a pump which causes circulation of the electrolyte through the system. An electronic control system is provided to sequentially energize the coils located at the opposite ends of the piston chambers. In one embodiment of this invention, six pistons are provided. The pistons are connected to a crankshaft, with the coils being energized in sequence to cause continuous rotation of the crankshaft. The energization of the coils causes the electrolyte in the electrolyte jackets surrounding the pistons to be exposed to current flow and changing electromagnetic fields, which encourages electrolysis of the electrolyte and the release of hydrogen gas $H^2$, water vapor and other byproducts carried therewith. The sound waves that are generated from the firing of the cylinders and the tuned plates cause the electrolyte to vibrate, encouraging the release hydrogen gas $H^2$ from the water. The electrolysis of the electrolyte and the release of hydrogen gas $H^2$ from the electrolyte jackets surrounding the pistons is further enhanced by the flow of current through the electrolyte from the coils to the pair of electrode or lead plates positioned in the electrolyte jacket surrounding the piston. The current passing through the electrolyte from the primary to the secondary lead plates acts to condition the electrolyte, creating an electromagnetic force.

While the pistons may have a smooth cylindrical outer surface, parallel grooves may be provided along the length of the piston to decease the outermost surface area and thus concentrate the lines of flux emanating from the coils. The torque ratio is increased, thereby providing for use at lower RPMs. Further, with the grooves, the cylinder length can be decreased from that of a smooth cylindrical outer surface, without a reduction in torque.

Continued rotation of the reciprocating piston engine caused by energizing the coils will cause the circulating electrolyte to rise in temperature and to begin generating hydrogen gas $H^2$, oxygen and electrolyte vapor which are released from the treated electrolyte and rise to the top of the electrolyte jackets. Continued application of voltage to the electrolysis cells will cause the circulating electrolyte to release hydrogen gas $H^2$, oxygen and electrolyte vapor which will rise to the main manifold. The heating of the treated electrolyte enhances the release of hydrogen gas $H^2$ and oxygen. The electrolyte temperature continues to rise as the reciprocating piston engine continues to operate, until it reaches the desired optimum temperature of 195 degrees F. for releasing the desired electrolyte vapor and providing for the splitting of the water molecule into hydrogen gas $H^2$ and oxygen. The optimum temperature is maintained by the cooling of the circulating electrolyte in the radiator. In one embodiment, when the circulation electrolyte reaches 195 degrees F., the small internal combustion engine is supplied with the hydrogen gas $H_2$ that is made.

Rotation of the utility motor caused by energization of the coils will cause the circulating electrolyte to raise in temperature thereby increasing the generation of hydrogen gas $H^2$. When sensors indicate that there is sufficient hydrogen gas $H^2$ being generated, the hydrogen burning internal combustion engine can be supplied with the hydrogen gas $H^2$. At the same time valves are used to control or regulate the re-circulation of hot exhaust gas to the intake manifold so as to increase the temperature of the gas mixture supplied to the small hydrogen burning internal combustion engine.

The optimum temperature of the electrolyte is maintained by cooling of the electrolyte in the radiator. In one embodiment, when the circulating electrolyte reaches 215 degrees F., the small hydrogen burning internal combustion engine is supplied with the hydrogen gas $H^2$ from the system.

The sound waves that are generated from the energization of the coils and current flow to the lead plates cause the electrolyte to vibrate, further encouraging the release hydrogen gas $H^2$ from the electrolyte. The electrolysis of the electrolyte and the release of hydrogen gas $H^2$ from the electrolyte in the electrolyte jackets surrounding the pistons is further enhanced by the flow of current through the electrolyte from the coils to the pair of electrodes or lead plates positioned in the electrolyte jacket surrounding each of the piston.

The second principal components of this invention are a plurality of lead acid flow batteries. Each of the lead acid flow batteries is formed of a number of internally electrically connected cells so as to provide a desired nominal voltage between the battery terminals. Parallel and serial connections are provided between the plurality of battery terminals to provide the desired nominal output voltage, such as 12, 24 or 36 volts.

Each of the batteries is housed in a separated container, with the plurality of cells having a common cover. Hydrogen gas $H^2$ generated in and released from the battery cells is collected within the cover and provided through a conduit to the internal combustion engine.

A control system is provided for maintaining the desired specific gravity (sp) and level of the electrolyte in each of the individual separate battery cells of the plurality of batteries. Flow paths are provided to supply each of the battery cells with electrolyte from the electrolyte jackets of the electromagnetically energized reciprocating piston engine, with concentrated sulfuric acid from a storage tank, and with electrolyte contained in a reservoir. Electrolyte removed from the bottom of each cell flows through conduits back to the reservoir.

The energization of the coils causes the electrolyte in the electrolyte jackets surrounding the pistons to be exposed to current flow, thus conditioning the electrolyte for return to the reservoir then to the mixing chamber and into the battery. When the flow battery is delivering a current, the spongy lead is oxidized to lead ions and the plates become negatively charged:

$Pb \rightarrow Pb^2 + 2e$-(oxidation)

During the charging process the sulfate ion of the electrolyte is regenerated and lead sulfate is converted back to spongy lead at the lead electrode. Hydrogen ions and sulfate ions of the electrolyte are regenerated and lead sulfate is converted back to lead dioxide at the lead dioxide electrode.

$PbO_2 + 4H + + SO_4^2 - + 2e$-(discharge>)(charge<)$PbSO_4$ (S)+$2H_2O$

By controlling the supply of treated electrolyte from the reservoir, and concentrated acid from the a storage tank to each of the battery cells, and the flow of electrolyte from each of the battery cells back to the reservoir, the electrolyte in each of the batteries may be kept at an optimum or desired specific gravity. Thus, each cell of a battery may be quickly restored to optimum specific gravity. By cyclically restoring each cell of a battery individually, the battery may be kept at near optimum charge.

A regulated closed loop flow path is provided between the reservoir and the radiator to keep the temperature of the electrolyte flowing through the system at an optimum temperature.

The system and method of this invention creates, recharges, and stores electrical energy in the batteries in sufficient quantity to continuously supply electrical energy to the electromagnetically energized reciprocating motor for propelling a vehicle, so long as the supply of concentrated sulfuric acid is not depleted. It also generates hydrogen gas $H^2$ and Oxygen to supply the internal combustion engine. Thus, the system and method of this invention provides kinetic rotating force from both an internal combustion engine and an electrical motor to provide rotational torque to a load, requiring only a supply of concentrated acid as the primary consumable fuel. Water is a secondary consumable, as it is depleted during the electrolysis of the electrolyte. However, after extended operation of the system, other materials will be consumed and need to be replaced, such as the lead plates in the electrolyte jackets, the lead in the batteries, or need to be removed, such as accumulated sulfur in the reservoir.

The system of this invention results in a high efficiency (by energy recovery components), high torque, long stroke reciprocating motor which can provide rotational torque to a load. It also can be used to generate a sufficient amount of hydrogen gas $H^2$ to be supplied as fuel to an internal combustion engine capable of generating enough power to operate or at least assist in propelling a motor vehicle.

DETAILED DESCRIPTION OF THE INVENTION

Figure 1A:
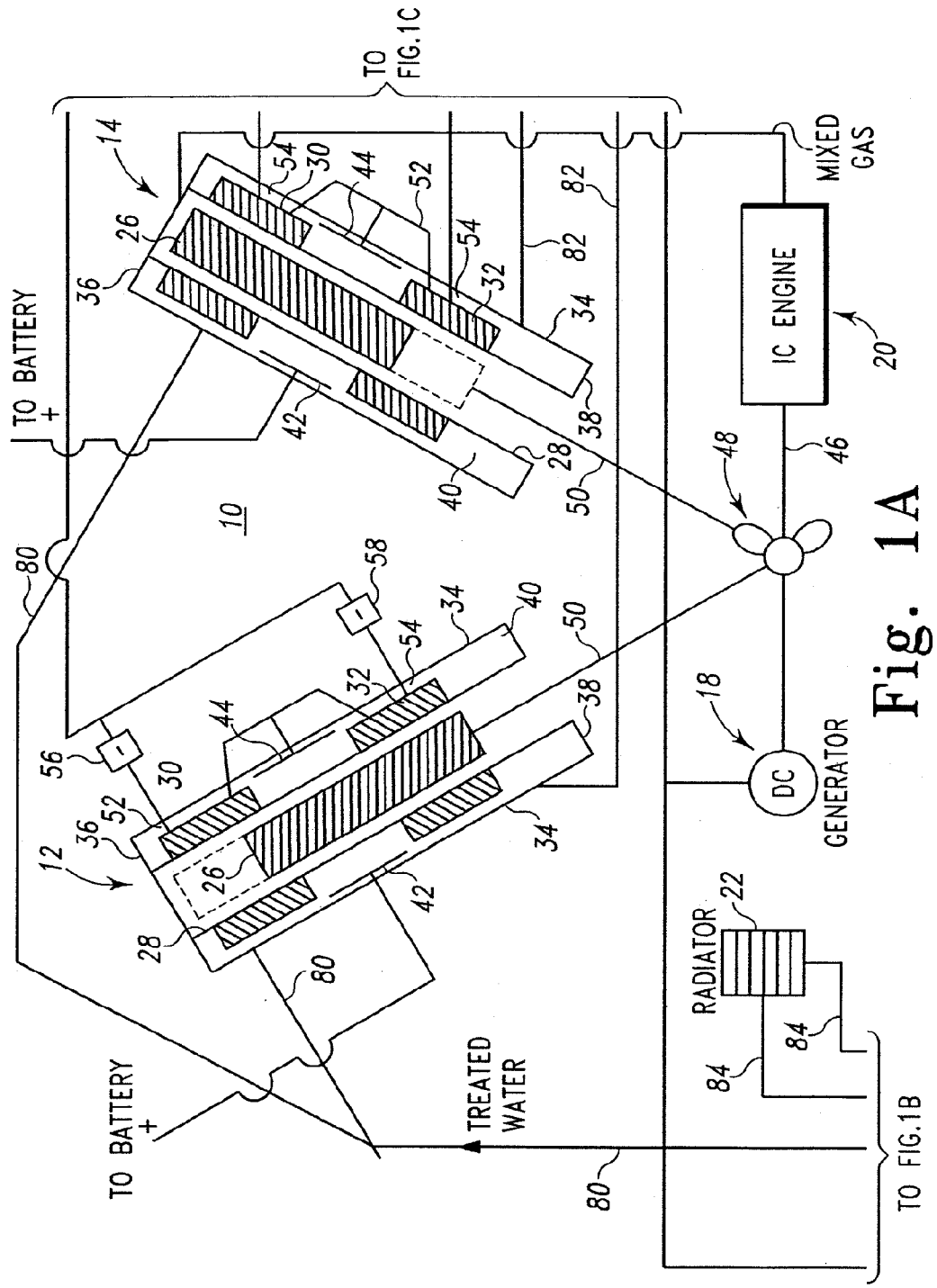
FIG. 1 is a schematic flow and pictorial diagram of a preferred embodiment of the system of this invention including an electromagnetically energized piston motor designed to enhance the performance of lead acid flow batteries.
Figure 1B:
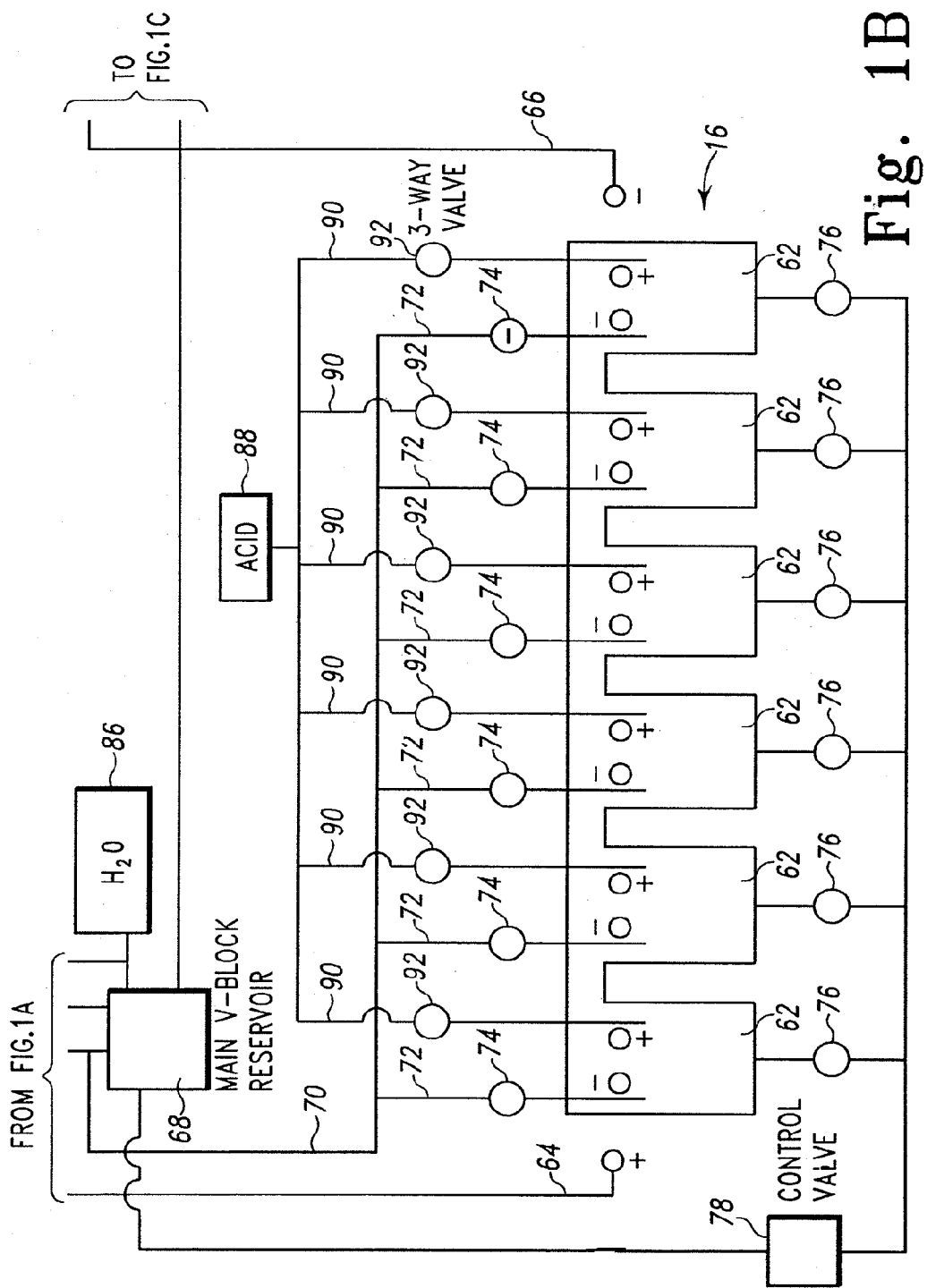
Figure 1C:
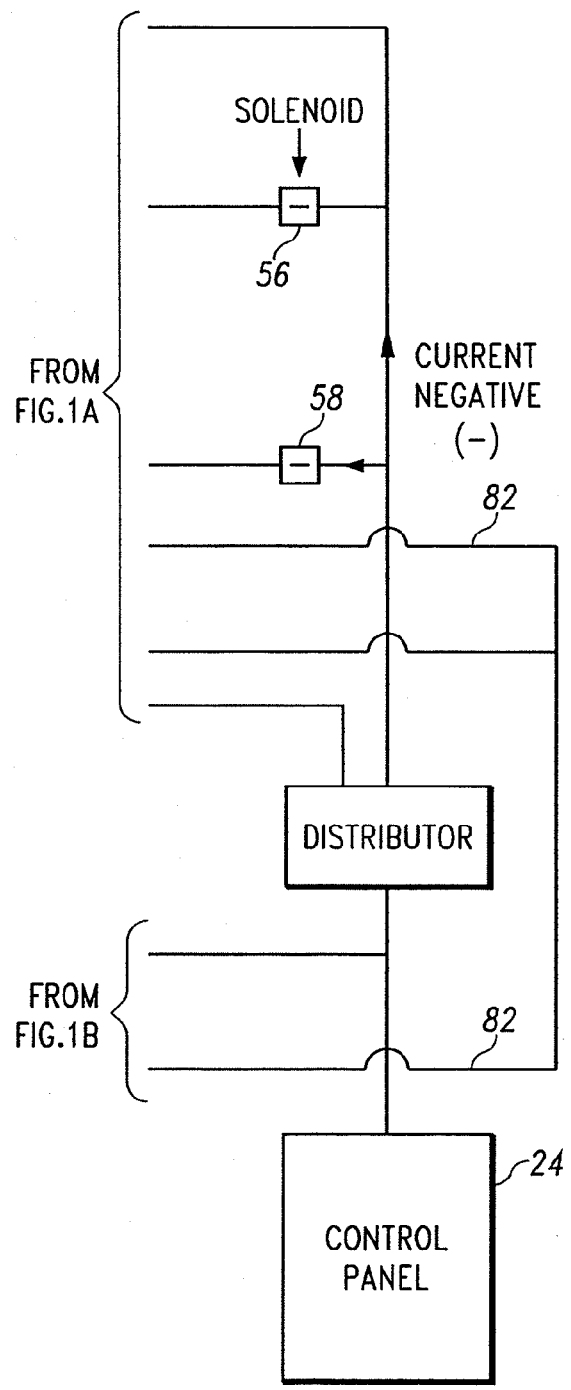

FIG. 1 is a schematic flow and pictorial diagram of a preferred embodiment of the system of this invention. The principal components of this preferred embodiment of the invention include a reciprocating piston motor 10, of which two cylinders 12 and 14 are shown, a plurality of lead acid flow batteries 16, a direct current generator 18, a hydrogen burning internal combustion engine 20, a radiator 22, and a control system and panel 24.

The cylinders 12 and 14 of piston motor 10, each include a piston 26 formed of a magnetic material such as pig iron. The pistons 26 reciprocates within an inner non-magnetic tube or cylinder 28. Placed around each of the cylinders 28 are a pair of coils 30 and 32, spaced apart from each other. The coils 30 and 32 are spaced such that when a portion of a piston 26 is located essentially within the full length of one of the coils, a portion of the opposite end of the piston is located within a portion of the other coil. An outer non-magnetic tube or cylinder 34 surrounds the inner tube 28 and is spaced from the outer cylindrical surface of the coils 30 and 32. The ends of the inner tube 28 and outer tube 34 are closed by toroidal members 36 and 38 to form a closed chamber 40 there between. Also located within the closed chamber are a pair of electrodes 42 and 44.

Drive shaft 46 of internal combustion engine 20 is connected to camshaft 48 of the reciprocating piston motor 10. Pistons 26 are connected to the camshaft or crankshaft 48 by connecting rods 50.

Direct current generator 18 is driven by the crankshaft 48 of reciprocating piston motor 10 and the drive shaft 46 of internal combustion engine 20. The control system 24 controls the supply of direct current from the dc generator 18 and the flow batteries 16 to the terminals 52 and 54 respectively of coils 30 and 32, and the electrodes 42 and 44 through the distributor 60, under the control of both limit switches actuated by lobes on the camshaft 48 and solenoid switches 56 and 58 respectively. By increasing or decreasing the current supplied to the electrodes, the rate of generation of hydrogen gas is increased or decreased.

The flow batteries 16 comprise a number of individual cells 62, the positive and negative terminals of which are connected in series and parallel circuits to provide the desired output voltage of the bank of flow batteries 16 between the positive output terminal 64 and the negative output terminal 66.

There are numerous flow paths for the flow battery electrolyte, and an individually controlled flow path through each cell 62. The main reservoir 68 for battery electrolyte is formed in the v-block 94 of the piston motor 10. A main flow path 70 from the reservoir 68 is connected to individual flow paths 72 to each of the cells 62. A flow regulator 74 is provided in each of the individual flow paths 72 to independently control the supply of electrolyte to each of the cells 62 from the reservoir 68 to maintain a desired ph and electrolyte level in each cell 62. Flow regulators 76 are provided to individually control the flow of electrolyte from each of the cells 62 back through a control valve 78 to the reservoir 68.

A flow path is also provided between each of the closed chambers 40 of the cylinders 12 and 14 and the reservoir 68. Electrolyte flows through path 80 to the closed chambers 40 and returns to the reservoir 68 through path 82.

A flow path 84 is provide to circulate electrolyte from the reservoir 68 to the radiator 22, so as to maintain the electrolyte in the reservoir at a desire temperature.

A reservoir 86 is provided for supplying water to the main reservoir when needed to make up for lost water and to adjust the desired main reservoir concentration of acid. A reservoir 88 is provided for concentrated acid. Individual flow paths 90 are provided to supply the concentrated battery acid to each of the cells 68. Flow regulators 92 are provided in the individual flow paths 90 to control the flow of concentrated acid to the individual cells 62.

Figure 2:
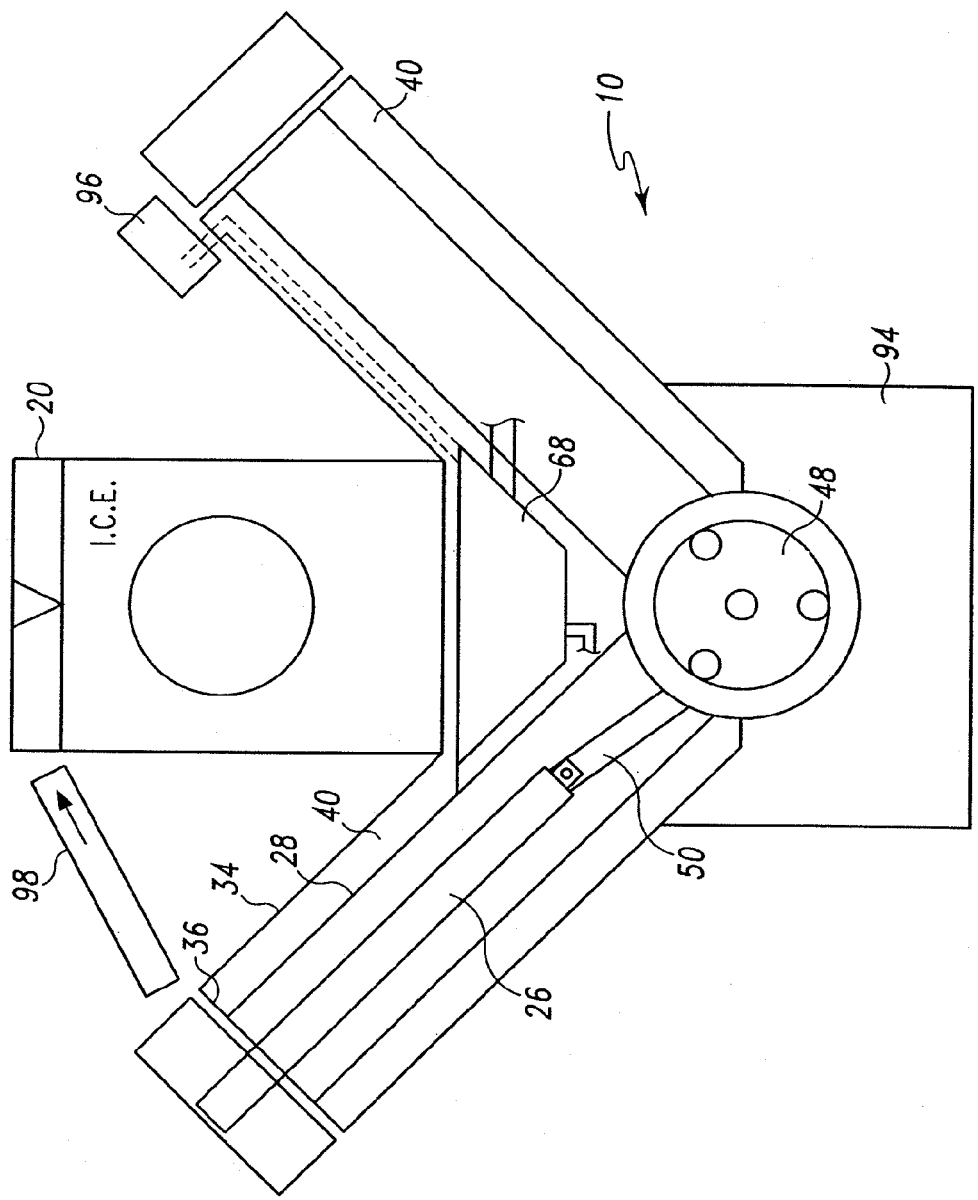
FIG. 2 is a cross-sectional view representative of an electromagnetically energized piston motor designed for use in the system of this invention.

Referring to FIG. 2, the piston motor 10 is further shown. The components of the piston motor 10 are identified with the same numerals as used in FIG. 1. The crankshaft 48 is supported in and the main reservoir 68 is located in the v-block 94 of the piston motor 10. A burp chamber 96 may be located at the outer end of the closed chamber 40, to receive hydrogen gas developed in the closed chamber 40. The hydrogen gas is delivered as shown at 98 to the internal combustion engine 20 as fuel. A main manifold is located at the outer end of each closed chamber 40 for collecting and returning the electrolyte to the main reservoir 68.

Figure 3:
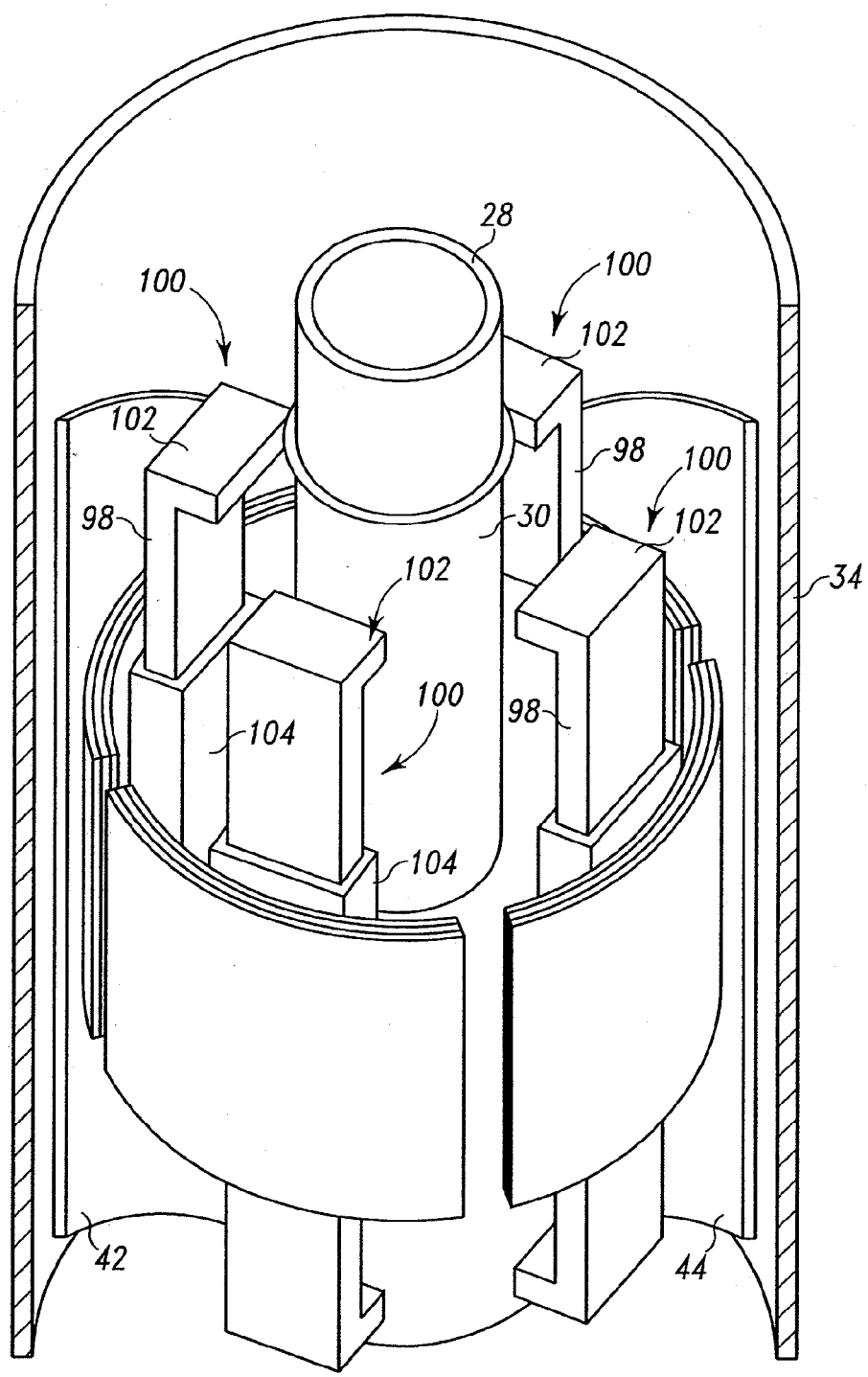
FIG. 3 is a cross-sectional view representing one of the piston assemblies of a electromagnetically energized piston motor designed for use in the system of this invention.

Referring to FIG. 3 details of some of the components of the cylinders 12 and 14 are shown. Located within the closed chamber 40 adjacent the outer cylinder 34 are the pair of lead plates 42 and 44. Also shown is the coil 30. Located in the closed chamber 40 between the coils 30 and 32 and the outer cylinder 34 are four bridge clips 100. Each of the bridge clips 100 is formed with a elongated u-shaped magnetic core 102, around each of which is wrapped a coil 104. The changing magnetic fields produced by the cyclic energization of the coils 30 and 32 induce alternating current flow in the coils 104. This alternating current is provided to a rectifier 106, shown in FIG. 5, which in turn is a supply of direct current.

Figures 4, 5:
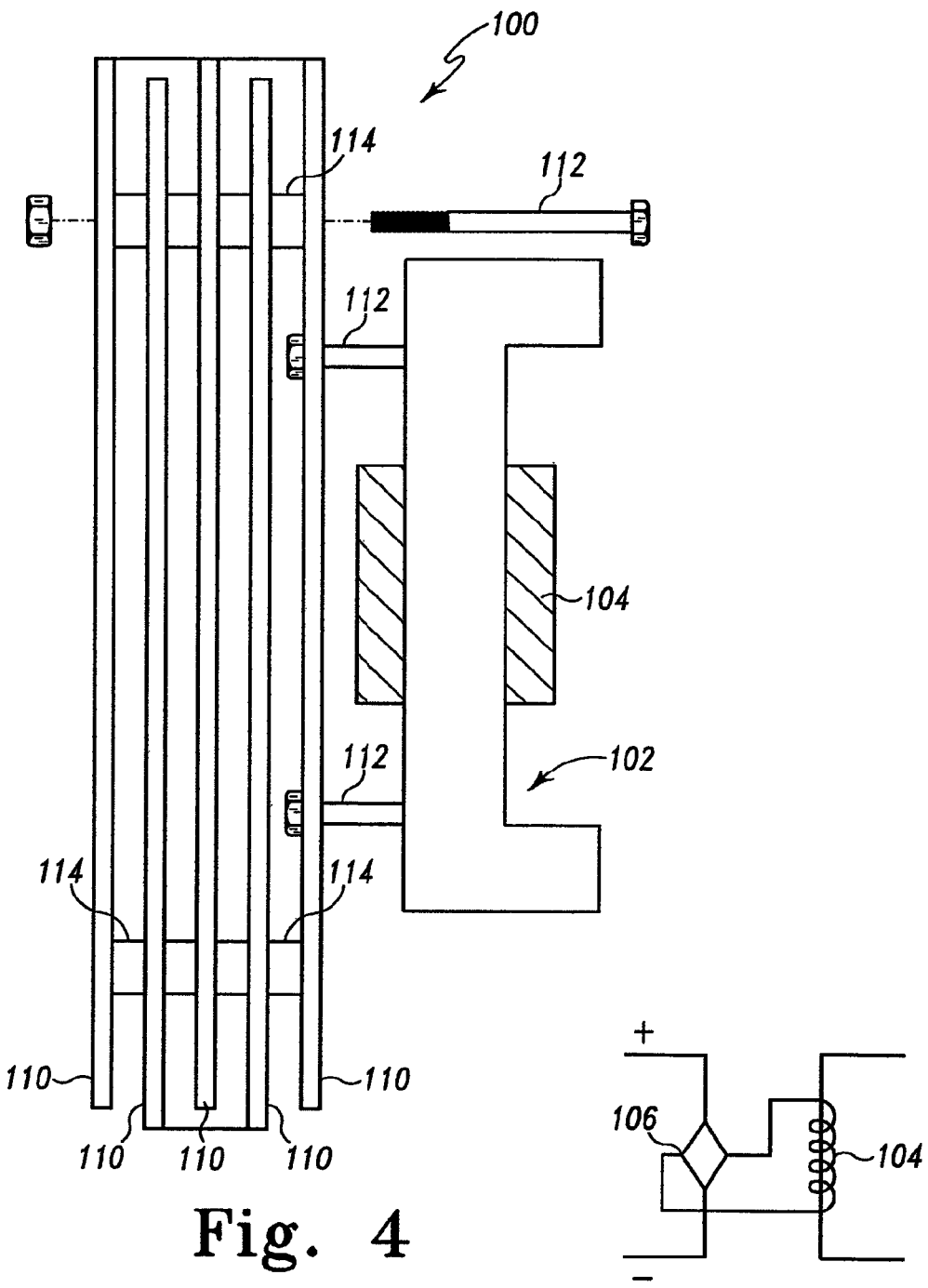
FIG. 4 is a cross-sectional view of a bridge clip assembly included in the piston assembly shown in FIG. 3.
FIG. 5 is circuit diagram of a portion of the bridge clip assembly shown in FIG. 4.

Referring to FIG. 4, a bridge clip 100 is shown in further detail. The bridge clips 100 include a plurality of spaced apart stainless steel plates 110. The stainless steel plates 110 are secured to each other by non-magnetic and non-conducting fasteners 112, such as nylon fasteners which pass through non-magnetic and non-conducting spacers 114. Alternate stainless steel plates 110 are connected to the positive and negative outputs of the rectifier 106, which is supplied with alternating current from the coil 104. The changing electrical field between the stainless steel plates 110 of the bridge clips increases hydrogen production in the closed chamber 40, as a result of being exposed to the increasing and decreasing magnetic fields of the coils 30 and 32.

Figure 6:
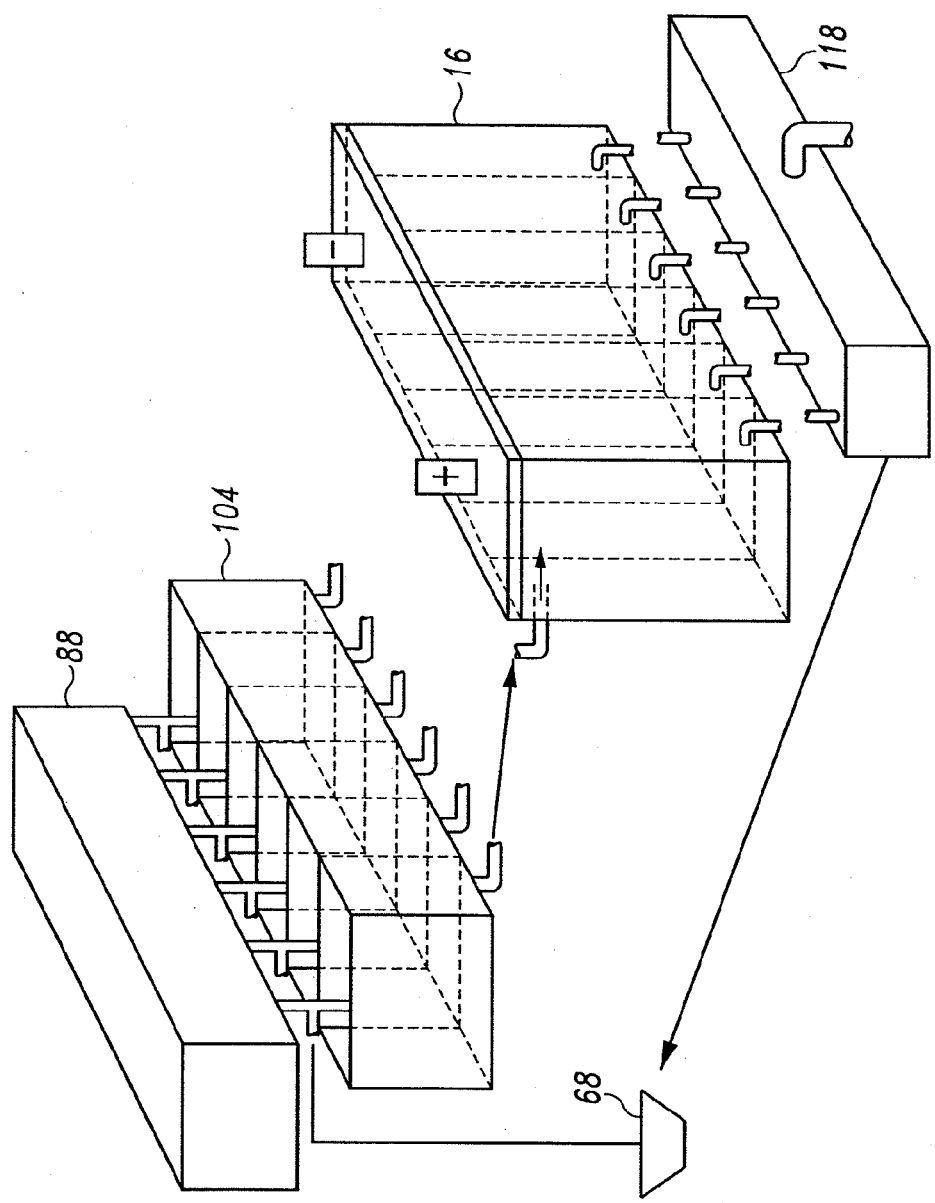
FIG. 6 is a perspective representative of a portion of an alternate flow arrangement for the electrolyte supplied to the individual flow cells.

Referring to FIG. 6, an alternate flow arrangement for the electrolyte supplied to the individual flow cells is shown. In this arrangement, a mixing chamber 116 is provided for each flow cell. The mixing chambers 116 are provided with concentrated acid from acid reservoir 88, and with electrolyte from the main reservoir 68. The mixed concentrated acid and electrolyte is then provided to the individual flow cell. Similarly, a collection tank 118 is provided to collect the electrolyte flowing from each of the cells, with the electrolyte being returned from the collection tank 118 to the main reservoir 68. Again, the flow of concentrated acid from the acid reservoir 88 and electrolyte from the main reservoir 68 is controlled by valves which are in turn regulated by measurements of the operating conditions of individual cells condition.

In summary, the pistons of the motor are connected to the crankshaft, with the coils being energized in a sequence which causes continuous rotation of the crankshaft. The energizing of the coils causes the electrolyte in the jackets surrounding the pistons to be exposed to changing electromagnetic fields created by the movement of the steel piston, which encourages the release of electrolysis of the electrolyte and release of hydrogen gas $H^2$ from the electrolyte. The sound waves that are generated from the energization of the coils and the tuned lead plates causes the electrolyte to vibrate, again enhancing the release hydrogen gas $H^2$ from the electrolyte. A magnetic pick-up is then induced by the coils causing the collapse of the primary magnetic field. The inductance is then used to promote further electrolysis along the four inner magnetic pick-up clip arrangements consisting of a rectifier, stainless steel plates and the magnetic pick-up consisting of laminated plates of an E-clip configuration. The release of the hydrogen gas $H^2$ from the treated electrolyte in the electrolyte jackets surrounding the pistons is further controlled by grounding the electrodes connected to the lead plates to prevent a free wheeling reverse energy release created when the pistons are driven by the power train in a coast mode.

The released hydrogen gas $H^2$ and oxygen from the electrolyte jackets and the electrolysis cells are vented to the main manifold that feeds the internal combustion engine. Excess gasses, if contained in the treated electrolyte as it circulates back to the reservoir, are vented at the reservoir through a relief valve and into the main manifold. The collected hydrogen gas $H^2$ in the main manifold is supplied as fuel to the internal combustion engine.

In a preferred embodiment of this invention, all cylinders are provided with a two way pressure relief valve to maintain desired pressures in the system.

When sensors indicate that there is sufficient hydrogen gas $H^2$ being generated, the internal combustion engine can be supplied with the collected gasses and electrolyte vapors from the main manifold. At the same time, valves are controlled to regulate the air fuel mixture supplied to the internal combustion engine. A limited quantity of exhaust gasses are then re-circulated to the air intake system of the internal combustion engine to maintain an higher operating temperature resulting in an increase in the temperature of the gasses entering the combustion chamber of the internal combustion engine.

The system of this invention provides several ways of controlling the amount of hydrogen gas $H^2$ released from the top surface of the electrolyte jackets and the electrolysis cells. These include regulating the current flow through the electrolyte between the lead plates in the electrolyte jackets of the cylinders, regulating the rate of rotation of the crankshaft of the electromagnetically energized reciprocating piston engine, regulating the temperature of the treated electrolyte in the system and by regulating the operation of the electrolysis cells.

The system of this invention uses all collected hydrogen gas $H^2$, oxygen and electrolyte vapor to provide fuel for the combustion process in the internal combustion engine resulting in increased energy output from the fuel ignition reaction. The reaction in the power stroke of the four stroke internal combustion engine, or other internal combustion engine, provides for the ignition by a spark plug or other similar device, of the hydrogen as aided by the provided oxygen. The hydrogen reacts to the provided spark and ignites to a temperature of 4000 degrees F. causing a downward pressure on the internal combustion piston. The reaction creates steam from the included electrolyte vapor, increasing the volume of the said vapor by a ratio of 1:1650 further causing downward motion of the said piston. The high temperature, over 1500 degrees F. causes the steam to split into the component hydrogen gas $H^2$ and oxygen, which is thereafter ignited as a secondary source of downward pressure on the piston. The affect of this resulting combustion in the internal combustion engine maximizes available hydrogen gas $H^2$. oxygen and electrolyte vapor, thereby requiring less fuel to be supplied.

While embodiments of the invention have been shown and described, it should be apparent to those skilled in the art that what has been shown and described are considered at present to be the preferred embodiments of the system of this invention including an electromagetically energized piston engine and flow type lead acid batteries designed to convert chemical and electrical energy to mechanical energy. In accordance with the Patent Statute, changes may be made to in the system of this invention without actually departing from the true spirit and scope of this invention. The appended claims are intended to cover all such changes and modifications which fall in the true spirit and scope of this invention.

The invention claimed is:

1. A motor providing mechanical energy from consumable sulfuric acid and water comprising:
    a plurality of reciprocating magnetic pistons, each driving a crankshaft, and each contained in an electrolyte jacket that contains a liquid electrolyte;
    a pair of spaced-apart electrical coils located in each electrolyte jacket, each of said pair of electrical coils having a main winding, wherein the main winding is electrically connected to a lead-acid battery through a pair of electrodes in the electrolyte jacket and adapted to be energized by current flowing through the liquid electrolyte in the electrolyte jacket;
    an electrolyte circulation and control system adapted to allow flow-through of the liquid electrolyte between the battery and each electrolyte jacket, the control system also adapted to supply fresh sulfuric acid and water to the liquid electrolyte to maintain a particular specific gravity of the electrolyte;
    a hydrogen gas flow and control system adapted to remove hydrogen gas from the each electrolyte jacket and supply it to a hydrogen internal combustion engine also mechanically connected to the crankshaft;
    whereby current from the battery causes each of the magnetic pistons to reciprocate and deliver energy to the crankshaft as well as to generate hydrogen gas in each electrolyte jacket, the hydrogen gas being supplied as fuel to the hydrogen internal combustion engine which in turn also delivers energy to the crankshaft.

2. The motor of claim 1 further comprising an auxiliary winding on at least one of said electrical coils electrically coupled to a rectifier, whereby collapsing magnetic fields in the main winding allow rectified DC current to be produced by the rectifier.

3. The motor of claim 2 wherein the rectified DC current is used to further produce hydrogen from said electrolyte.

4. The motor of claim 1 adapted to remove both hydrogen and oxygen gas from each electrolyte jacket and supply a mixture of hydrogen and oxygen to the hydrogen internal combustion engine.

5. The motor of claim 1 further comprising an electrolyte cooling system adapted to cool the electrolyte and maintain a predetermined electrolyte operating temperature.

6. The motor of claim 1 further comprising a sulfuric acid storage tank and a water storage tank each fluidly connected to the electrolyte circulation and control system.

7. A motor comprising a plurality of magnetic pistons and coils adapted to cause the pistons to reciprocate when DC current is applied sequentially to the coils, wherein the DC current also passes through an electrolyte solution producing hydrogen gas, the current being supplied by a flow-through electrolyte battery, electrolyte in the battery being the same electrolyte as the electrolyte solution producing hydrogen gas; the electrolyte solution being maintained at a predetermined specific gravity by continuous addition of sulfuric acid and water.

8. The motor of claim 7 wherein the hydrogen gas is produced an electrolyte jackets surrounding the pistons.

9. The motor of claim 7 wherein the hydrogen gas is used to power a hydrogen internal combustion engine.

10. The motor of claim 9 wherein the magnetic pistons and the hydrogen internal combustion engine are mechanically coupled to a single crankshaft.

11. A method for producing mechanical energy comprising:
- applying DC current to sets coils after passing said current through an electrolyte solution, wherein said current produces hydrogen gas;
- allowing magnetic fields from said sets of coils to reciprocate magnetic pistons mechanically coupled to a crankshaft;
- using said hydrogen gas to power a hydrogen internal combustion engine also mechanically coupled to said crankshaft;
- continuously replenishing said electrolyte solution to maintain a predetermined specific gravity.

12. The method of claim 11 wherein said electrolyte solution is a mixture of sulfuric acid and water.

13. The method of claim 11 further comprising removing secondary DC current through a rectifier from auxiliary windings on said coils.

14. The method of claim 13 wherein said secondary DC current is also used to produce hydrogen gas from said electrolyte.

* * * * *